(12) United States Patent
Rha et al.

(10) Patent No.: US 8,476,339 B2
(45) Date of Patent: Jul. 2, 2013

(54) METHOD AND APPARATUS FOR MAKING COMPOSITE SOLID SURFACE ARTICLE AND COMPOSITE SOLID SURFACE ARTICLE CONTAINING LARGE PARTICLES

(75) Inventors: Do Choon Rha, Seoul (KR); Tae Hoon Kim, Yeosu-si (KR); Mi Gon Kim, Yeosu-si (KR); Gwang Ho Jung, Yeosu-si (KR)

(73) Assignee: Cheil Industries Inc., Gumi-si (KR)

( * ) Notice: Subject to any disclaimer, the term of this patent is extended or adjusted under 35 U.S.C. 154(b) by 525 days.

(21) Appl. No.: 12/619,787

(22) Filed: Nov. 17, 2009

(65) Prior Publication Data

US 2010/0062256 A1    Mar. 11, 2010

Related U.S. Application Data

(62) Division of application No. 11/296,938, filed on Dec. 8, 2005, now abandoned.

(30) Foreign Application Priority Data

Dec. 8, 2004   (KR) .................. 10-2004-0102843

(51) Int. Cl.
C09D 5/29              (2006.01)
(52) U.S. Cl.
USPC ........................................................ 523/171
(58) Field of Classification Search
USPC ........................................................ 523/171
See application file for complete search history.

(56) References Cited

U.S. PATENT DOCUMENTS

| | | | |
|---|---|---|---|
| 4,652,596 | A | 3/1987 | Williams et al. |
| 6,323,259 | B1 | 11/2001 | Ikegami et al. |
| 6,511,750 | B1 | 1/2003 | Yanagase et al. |
| 2001/0006991 | A1 | 7/2001 | Vidaurre et al. |
| 2006/0121286 | A1 | 6/2006 | Rha et al. |

FOREIGN PATENT DOCUMENTS

| | | |
|---|---|---|
| CN | 2063867 U | 10/1990 |
| DE | 3837430 A1 | 5/1990 |
| FR | 2003091 | 11/1969 |
| JP | 07-205338 A | 8/1995 |
| JP | 9-188556 | 7/1999 |
| JP | 11-291267 | 8/1999 |
| JP | 2001-009829 | 1/2001 |
| JP | 2001-9829 A | 1/2001 |
| JP | 2001-009831 | 1/2001 |
| KR | 10-1999-0039632 A | 6/1999 |
| KR | 10-1999-0039632 A1 | 6/1999 |
| KR | 1019990039632 | 6/1999 |
| KR | 1020060064143 | 10/1999 |
| SU | 1426987 A1 | 9/1988 |
| SU | 1728162 A1 | 4/1992 |
| SU | 1759807 | 9/1992 |
| WO | 2005/014256 A1 | 2/2005 |
| WO | 2006/062363 A1 | 6/2006 |

OTHER PUBLICATIONS

International Search Report in counterpart International Application No. PCT/KR2005/004200, dated Mar. 15, 2006.
Extended European Search Report in counterpart European Patene Application No. 05819112.3, dated Jun. 23, 2009.

*Primary Examiner* — Edward Cain
(74) *Attorney, Agent, or Firm* — Summa, Additon & Ashe, P.A.

(57) ABSTRACT

A method and apparatus for producing a composite solid surface article are disclosed. The method includes feeding a first composition toward a mixing point and feeding solid particles toward the mixing point. The method further includes mixing at the mixing point the first composition and the solid particles fed to the mixing point to form a second composition, and transferring the second composition away from the mixing point. The method further comprises polymerizing the polymerizable compound in the second compound so as to form a curable composition comprising the solid particles. The apparatus includes a solid particle feeder, a slurry feeder and a blender configured to blend and transfer a mixture of the solid surface forming slurry and solid particles away from the blending area. The composite solid surface article produced using the method and apparatus contain particles with a size greater than 5 mm.

10 Claims, 4 Drawing Sheets

METHOD AND APPARATUS FOR MAKING COMPOSITE SOLID SURFACE ARTICLE AND COMPOSITE SOLID SURFACE ARTICLE CONTAINING LARGE PARTICLES

CROSS REFERENCE TO RELATED APPLICATIONS

This non-provisional application is a divisional of U.S. application Ser. No. 11/296,938, filed Dec. 8, 2005, pending, which is hereby incorporated by reference in its entirety, and claims priority therefrom under 35 USC Section 120. This application also claims priority under 35 USC Section 119 from Korean Patent Application No. 10-2004-102843, filed Dec. 8, 2004, which is also hereby incorporated by reference in its entirety.

BACKGROUND

1. Field of the Invention

The invention relates to a composite solid surface article. More particularly, the invention relates to a composite solid surface article containing large solid particles and a method and an apparatus for preparing such an article.

2. Discussion of Related Technology

Recently, composite solid surface materials have become popular for kitchen and bathroom countertops and for many other uses. The composite solid surface materials are also referred to as artificial or synthetic marble as they substitute and mimic the patters of natural stone such as marble or granite. Conventional artificial marble has certain limitations in providing various patterns.

Generally the artificial marble is produced by curing a resin mixture, which include inorganic filler, pigments, curing agents, dispersing agents and resin syrup. To improve the appearance of the artificial marble, solid particles such as crushed artificial marble chips are often added to the resin mixture. Typically, artificial marble chips having a size of about 0.1-5 mm are used for this purpose.

Japanese Patent No. 3192955 discloses an artificial marble using three different marble chip groups: a first group having a size of 0.1-0.5 mm, a second group having a size of 0.5-1.7 mm and a third group having a size of 1.7-5.0 mm. Japanese Patent Laid-open No. 11-291267 also discloses an artificial marble having three groups of marble chips, in which the size of the marble chips is in the range of 100-5000 μm.

SUMMARY OF THE INVENTION

One aspect of the invention provides a method of producing a composite solid surface article. The method comprises: feeding a first composition, which may comprise a polymerizable compound, toward a mixing point; feeding solid particles toward the mixing point; mixing at the mixing point the first composition and the solid particles fed to the mixing point to form a second composition comprising the polymerizable compound and solid particles; transferring the second composition away from the mixing point; and polymerizing the polymerizable compound in the second compound so as to form a curable composition comprising the solid particles.

The foregoing method may further comprise controlling at least one of a feeding rate of the first composition and a feeding rate of the solid particles. In the foregoing method, controlling may comprise maintaining at least one of the feeding rates of the first composition and the solid particles substantially close to a predetermined value over a period of time. The controlling may comprise varying at least one of the feeding rates of the first composition and the solid particles substantially constant. The method may further comprise mixing the second composition while transferring. The first composition may be not a curable form. The solid particles may be generally homogeneously dispersed in the curable composition. The solid particles may have irregular shapes. The solid particles may have one or more colors that may be substantially different from that of the first composition. The solid particles may have a diameter with a longest length from about 3 mm to about 100 mm. The solid particles may have an average diameter from about 7 mm to about 15 mm. The first composition may comprise solid particles having a diameter from about 0.1 mm to about 5 mm. The first composition may further comprise a polymerization initiator and an inorganic filler. The first composition may comprise 100 parts by weight of an acrylic resin syrup comprising the polymerizable compound, about 100 to about 200 parts by weight of the inorganic filler, and about 0.1 to about 10 parts by weight of the polymerization initiator. At least one of feeding the first composition, feeding solid particles and transferring may be performed continuously or repetitively for a period of time. The method may further comprise curing the curable composition to provide a composite solid surface article.

Another aspect of the invention also provides a method of producing a composite solid surface article. The method comprises: conveying solid particles along a passage; adding a solid surface forming slurry to the solid particles that may be being conveyed when the solid particles may be passing a location in the passage; blending the solid surface forming slurry and the solid particles; and thickening the solid surface forming slurry while blending, thereby forming a fluidable solid composition comprising the solid particles dispersed therein generally homogeneously.

In the above-describe method, the solid particles may have irregular shapes. The solid particles may have a diameter from about 5 mm to about 70 mm. The solid particles may have an average diameter from about 7 mm to about 50 mm. The solid surface forming slurry may comprise solid particles having a diameter from about 0.1 mm to about 5 mm. The solid particles may comprise pieces of a natural or synthetic solid surface material. The solid particles may be produced by crushing rocks, granite or a synthetic solid surface material. The solid surface forming slurry may comprise a polymerizable compound and an inorganic filler. The thickening may comprise polymerizing the polymerizable compound. At least one of conveying and adding may be performed continuously or repetitively for a period of time. The method may further comprise solidifying the fluidable solid composition into a shape to provide a composite solid surface article Another aspect of the invention provides a composite solid surface article produced by the above-described methods.

A further aspect of the invention provides a composite solid surface article. The article comprises: a matrix of at least one polymer resin; a filler dispersed in the matrix; and solid particles dispersed in the matrix having a size from about 7 to about 100 mm. In this article, the solid particles may be generally homogeneously dispersed throughout the matrix of the article1. The solid particles may have a diameter from about 12 mm to about 50 mm. The solid particles may have a diameter from about 7 mm to about 15 mm. The at least one polymer resin may comprise an acrylic resin. At least some of the solid particles may have one or more colors, which may be substantially different from a color surrounding the at least some of the solid particles in the article.

A still further aspect of the invention provides an apparatus for preparing a composition for a solid surface material. The apparatus comprises: a solid particle feeder configured to feed solid particles a blending area; a slurry feeder configured to feed a solid surface forming slurry to the blending area; and a blender configured to blend and transfer a mixture of the solid surface forming slurry and solid particles away from the blending area.

In the above-described apparatus, the feeder may comprise a shaft and a blade attached to the shaft with a pitch. The shaft may be tilted toward the blending area with reference to the ground at an angle from about 5° to about 70°. The pitch may be sized to transfer solid particles with may have a diameter from about 7 mm to about 15 mm. The pitch may be sized to transfer solid particles with may have a diameter from about 5 mm to about 50 mm. The pitch may be sized to transfer solid particles with may have a diameter from about 3mm to about 100 mm. The apparatus may further comprise a solid particle inlet for supplying the solid particles to the feeder. The feeder may comprise a shaft and a blade attached to the shaft, wherein the blade may be not formed onto the shaft in an area near the inlet. The blender may comprise a blade connected to a shaft. The solid particle feeder and the blender form an integral body.

DETAILED DESCRIPTION OF EMBODIMENTS

As discussed above in the section of Discussion of Related Technology, typically small solid particles (marble chips) with a size ranged 0.1-5 mm have been added in the artificial marble. This is because, marble chips having a size greater than 5 mm size are difficult to transfer through valves or conduits of a mixer. Also, larger chips often damage the mixer during mixing. Further, larger chips tend to settle when mixed with the resin mixture. Therefore, even if larger marble chips are added, they may not uniformly dispersed throughout the matrix of the artificial marble. The present invention solves these problems and produce artificial marble products in which large chips are generally uniformly dispersed therein. Now various embodiments of the invention are described.

Figure 1:
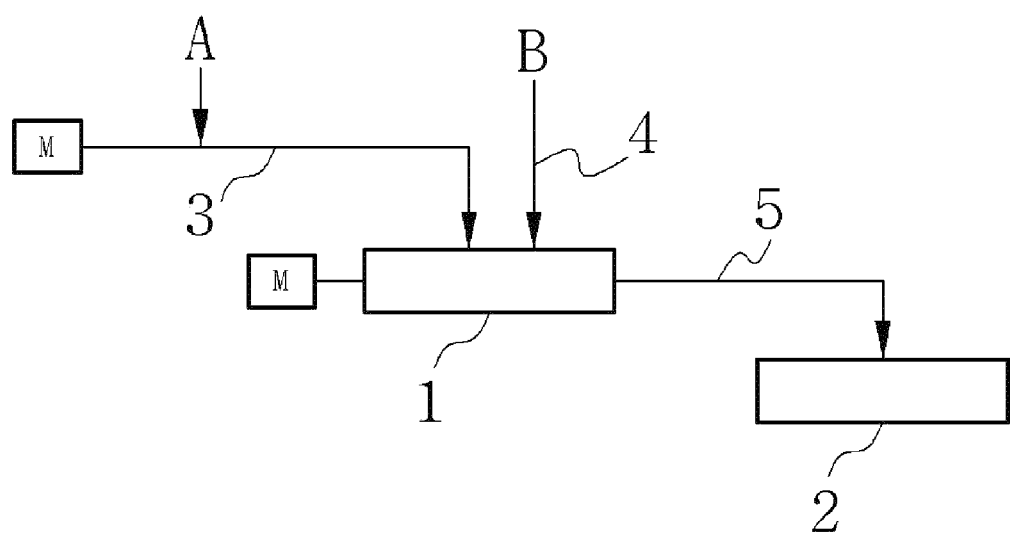
FIG. 1 is a schematic view of a system for producing artificial marble according to an embodiment of the invention.

In the system illustrated in FIG. 1, a mixer 1 receives a supply 3 of marble chips (A) and a supply 4 of a resin mixture (B). The mixer 1 discharges a composition 5 containing the marble chips and resin mixture via an outlet. In one embodiment, the mixer 1 is a continuous mixer continuously receives the marble chip supply 3 and the resin mixture supply 4, and continuously discharges the composition 5. In another embodiment, the mixer 1 may be a batch mixer, in which the marble chips and resin mixture are supplied and mixed in a batch mode, and the composition 5 is discharged after mixing in the mixer. In still another embodiment, the mixer 1 may be a mixer operated in a semi-batch/semi-continuous mode, where a batch operation is continuously and repeatedly conducted. In one embodiment, the mixer is a line mixer. As will be described further in the embodiment of with FIG. 3, the mixer 1 may have two inlets, one for receiving the marble chip supply 3 and the other for receiving the resin mixture supply 4. In the alternative, the mixer 1 may have only one inlet through which both the marble chip supply 3 and the resin mixture supply 4 can be introduced.

In one embodiment, the composition discharged from the mixer 1 may be in a solid form with some fluidity, which can be cured upon certain treatment such as cooling or heating depending upon the components of the resin mixture (B) supplied to the mixture. The curable composition 5 is then processed or treated to provide a solid surface article or artificial marble product in the following step or operation 2. The step 2 may include transferring the composition 5 on a conveyer belt.

In embodiments of the invention, the marble chips refer to any solid particles in various sizes and in irregular shapes. In embodiment, the marble chips are pieces of artificial or natural marble or rock. In embodiments, the marble chips are chosen to have one or more colors that are different from the color(s) of the pigments used in the resin mixture. In one embodiment, these marble chips are produced by crushing or pulverizing artificial or natural marble or rock into pieces of desired sizes. One of ordinary skill in the art will appreciate appropriate any other materials for the marble chips and appropriate any other methods for producing the marble chips into desired sizes.

In embodiments of the invention, the marble chips that are supplied to the mixer 1 have a diameter or particle size from about 0.1 mm to about 100 mm. In one embodiment, the marble chips have a diameter or particle size from about 3 mm to about 70 mm. In one embodiment, the marble chips have a diameter or particle size from about 5 mm to about 50 mm. In one embodiment, the marble chips have a diameter or particle size from about 12 mm to 20 mm. Optionally, the marble chips have a diameter or particle size from about 7 mm to about 15 mm. In one embodiment, the marble chips have a diameter or particle size from about 10 mm to about 25. In further embodiments, at least part of the marble chips that are supplied to the mixer 1 has a diameter or particle size approximately 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, etc. In embodiments, various sizes of the marble chips used in two or more the foregoing embodiments may be mixed.

In embodiments of the invention, the resin mixture includes resin syrup, inorganic filler, a pigment, a polymerization initiator, a dispersing agent, etc. The resin syrup includes one or more polymerizable compound and optionally one or more polymer compounds. In one embodiment, the resin syrup is acrylic resin syrup, which comprises one or more acrylic monomers and optionally one or more acrylic polymer compounds. In one embodiment, the acrylic resin comprises polyacrylate. Examples of the inorganic filler are calcium carbonate, aluminum hydroxide, silica, alumina, barium sulfate, magnesium hydroxide, etc. In one embodiment of the invention, aluminum hydroxide can be used to provide transparent and elegant appearance of the artificial marble. Examples of the polymerization initiator are benzoyl peroxide, lauroyl peroxide, butyl hydroperoxide, cumene hydroperoxide, other peroxide compounds, azobisisobutylonitrile, other azo compounds and the like. One of ordinary skill in the art will appreciate appropriate any other materials for use in the resin mixture.

In one embodiment, the resin mixture is in the form of slurry. In one embodiment, the resin mixture contains 100 parts by weight of acrylic resin syrup, 100 to 200 parts by weight of inorganic filler, and 0.1 to 10 parts by weight of a polymerization initiator. The compositional relations of the components of the resin mixture may vary depending upon desired physical properties, colors, appearance of the artificial marble. One of ordinary skill in the art will appreciate variations of the compositional relations and will be able to select a certain composition based on the desired properties, colors, patters, etc. of the artificial marble.

In some embodiment, the resin mixture further includes certain marble chips as well. In such embodiments, although not limited thereto, the marble chips included in the resin mixture have sizes substantially different from those of the marble chip supply 3. In one of such embodiments, the marble chips included in the resin mixture has sized smaller than those of the marble chip supply 3. In one embodiment, the marble chips included in the resin mixture have an average diameter from about 0.1 mm to about 5 mm. In one embodiment, the marble chips included in the resin mixture have an average diameter from about 0.1 mm to about 0.15 mm.

In one embodiment, the marble chips are continuously supplied to the mixer 1 for a period of time at a predetermined feed rate, e.g., a predetermined quantity (volume or weight) per minute. In one embodiment, the marble chips may be continuously supplied to the mixer 1 using a quantitative feeding belt (not shown). In another embodiment, the mixer 1 may include a continuous quantitative feeder to continuously transfer marble chips to an area where the chips are mixed with the resin mixture, whether the marble chips are supplied to the mixer 1 in a continuous or batch mode. In these embodiments involving any continuous operation, the supply does not have to be continuous throughout. In another embodiment, a small amount of the marble chips may be supplied to the mixer 1 or its mixing area repeatedly rather than continuously. In still another embodiment for a batch or semi-batch operation, an amount of the marble chips for a single batch or semi-batch mixing may be added to the mixer 1 or its mixing area at once.

In one embodiment, the resin mixture is continuously supplied to the mixer 1 for a period of time at a predetermined feed rate, e.g., a predetermined quantity (volume or weight) per minute. In one embodiment, the resin mixture may be continuously supplied to the mixer using a quantitative feeding tube or belt, if appropriate. In another embodiment, the mixer 1 may include a continuous quantitative feeder to feed the resin mixture to an area where the resin mixture is mixed with the marble chips, whether the resin mixture is supplied to the mixer 1 in a continuous or batch mode. In these embodiments involving any continuous operation, the supply does not have to be continuous throughout. In another embodiment, a small amount of the resin mixture may be supplied to the mixer 1 or its mixing area repeatedly rather than continuously. In still another embodiment for a batch or semi-batch operation, an amount of the resin mixture for a single batch or semi-batch mixing may be added to the mixer 1 or its mixing area at once.

In supplying the marble chips and resin mixtures to the mixer 1 or its mixing area continuously or repeatedly, either or both the feed rates of the marble chips and resin mixture can be controlled. In one embodiment, the feed rate of the marble chips is substantially maintained for a period of time. Similarly, the feed rate of the resin mixture is substantially maintained for a period of time. In this embodiment, the resulting artificial marble products would have generally uniform dispersion of the marble chips therein. In another embodiment, at least one of the feed rates of the marble chips and the resin mixture changes over time. In this embodiment, the resulting artificial marble products may have varying distribution of the marble chips. One of ordinary skill in the art will be able to control the feed rates of the marble chips and resin mixture to the mixer 1 or to an area of the mixer 1 where the marble chips and resin mixture are mixed together.

In one embodiment, about 10 to about 200 parts by weight of marble chips are added to 100 parts by weight of the resin mixture. In one embodiment, about 30 to about 100 parts weight of marble chips are mixed with 100 parts by weight of the resin mixture. The relative amounts of the marble chips and resin mixture may vary significantly to produce desired patterns of the artificial marble. One of ordinary skill in the art will appreciate an appropriate amount of the marble chips relative to the amount of the resin mixture in view of the materials of the marble chips and the components of the resin mixture.

The artificial marble produced from the system and method of FIG. 1 or by any other embodiments of the invention is a hard solid material which contains a polymeric matrix. Other ingredients added in the manufacturing process including the filler and marble chips are dispersed in the polymeric matrix. In embodiments of the invention, the filler is substantially uniformly dispersed in the matrix. Further, in embodiments of the invention, the marble chips are generally uniformly dispersed in the matrix.

In embodiments, marble chips in the resulting artificial marble having a diameter or particle size from about 0.1 mm to about 100 mm. In embodiments, at least part of the marble chips substantially uniformly dispersed in the polymeric matrix has a diameter or particle size about 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, etc. In embodiments where the marble chips with a particle size greater than about 5, 6, 7, 8, 9, 10, 11 or 12, the look of the resulting artificial marble may be aesthetically pleasing to an average person as the surface pattern of the artificial marble may look more natural as can be found in, for example, coarse-grained texture of granite.

At least part, if not most or all, of the marble chips has one or more colors contrasting the background thereof, which surrounds the marble chips. The color of the background may be controlled by the color(s) of the filler, pigments or the polymeric matrix. In one embodiment, at least part of the marble chips has one or more colors substantially different from the color(s) of their surrounding. In another embodiment, at least part of the marble chips has one or more colors that are similar to the color(s) of their surrounding and substantially different tone from that of their surrounding.

The artificial marble produced according to various embodiments of the invention provides one or more solid surfaces. The solid surface of the artificial marble can be formed flat or curved. The artificial marble can be shaped into almost any form, shape or structure by molding, machining or any other appropriate processing, which can be readily appreciable by one of ordinary skill in the art. The artificial marble with one or more solid surfaces has a lot of applications. The artificial marble can be used as a material for a kitchen countertop, a bathroom countertop, a workstation countertop, etc. Also, the artificial marble can be used as a building material for interior walls, exterior walls, floors or tiles. As such, embodiments of the invention includes an artificial marble countertop supported by a structure or frame, a building or house containing an artificial marble surface as a wall, a floor or a countertop, etc. One of ordinary skills in the art will be able to appreciate other applications of the artificial marble produced by various embodiments of the invention.

Figure 2:
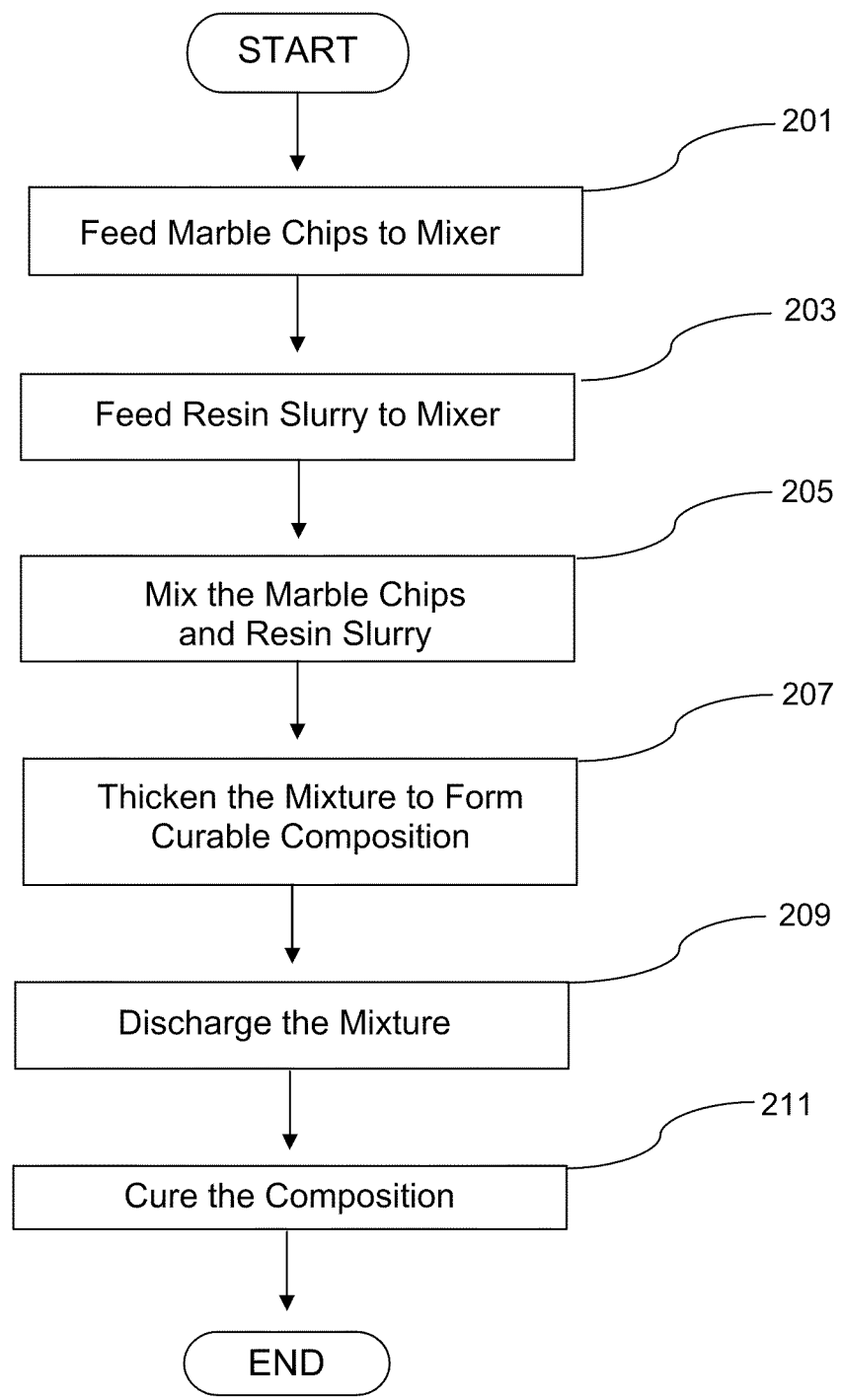
FIG. 2 is a flowchart of a process for producing artificial marble according to an embodiment of the invention

Now referring to FIG. 2, an embodiment of a process for producing artificial marble is described. At step 201, marble chips are fed to a mixer or a mixing area of the mixer. At step 203, subsequently, simultaneously or prior to step 201, a resin mixture or resin slurry is fed to the mixer or its mixing area. Either or both of the feeding of the marble chips and resin slurry may be performed continuously, partly continuously, repetitively or at once. In feeding for an extended period, the feed rates of the marble chips and the resin slurry may be controlled. At step 205, the marble chips and the resin slurry are mixed together in the mixer or its mixing area. As the marble chips and the resin slurry are mixed, the polymerizable compounds contained in the resin slurry polymerize, and the mixture gets thicker and solidifies as in step 207. The polymerization may begin before the mixing and continues to further thicken the mixture upon mixing. As the polymerization further continues, the mixture of the marble chips and resin slurry turns to a curable composition that contains the marble chips. The mixer discharges the curable composition or partly solidified mixture of the marble chips and resin slurry as in step 209. The discharge may be carried out continuously, partly continuously, repetitively or at once. The curable composition is then cured to form a shaped composite solid surface article as in step 211.

In one embodiment, the rate of the feeding 201 and 203 and the rate of the discharge 209 may match to form a substantially steady state operation for an extended period of time. In another embodiment, the rate of the feeding 201 and 203 and the rate of the discharge may not match. In one embodiment the marble chips is mixed while being supplied to the mixer. The resin slurry is also mixed while being supplied to the mixer. In one embodiment, the mixture of the resin slurry and marble chips are continuously mixed and transferred through a conduit of the mixer until it is discharged.

Figure 3:
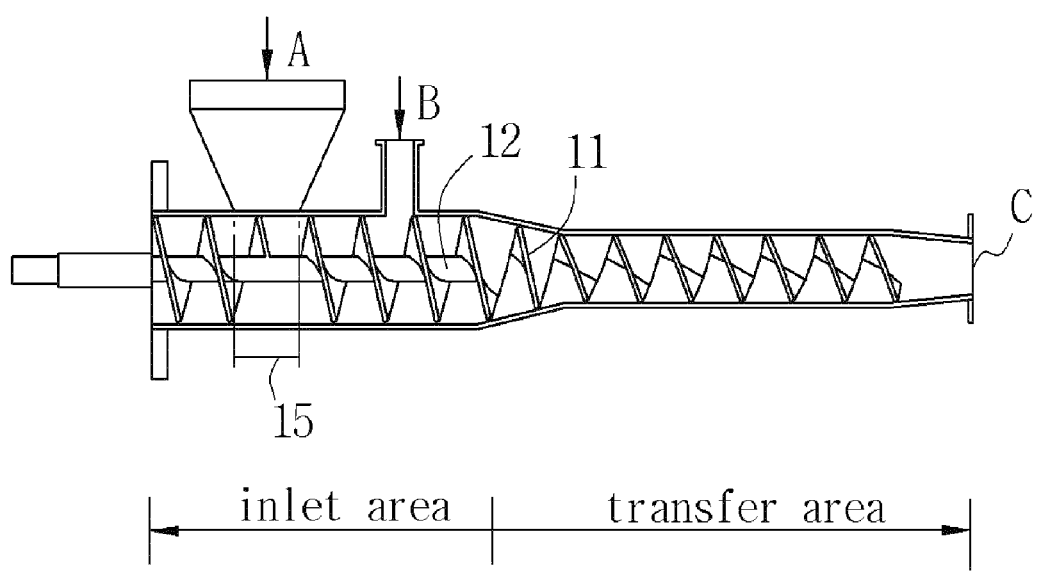
FIG. 3 is a schematic cross-sectional view of an apparatus for use in producing artificial marble according to an embodiment of the invention.

FIG. 3 illustrates a line mixer in accordance with an embodiment of the invention. The illustrated line mixer has a generally linear conduit with two supply inlets A and B and a discharge outlet C. The inlet A is to receive marble chips, and the inlet B is to receive resin slurry. The discharge outlet C is to discharge the mixture of the marble chips and the resin slurry in a curable composition. The line mixer has a shaft 12 extending along and rotatable about an axis within the linear conduit. One or more screws or blades 11 are attached to the shaft to mix marble chips and the resin slurry and to transfer the mixture toward a discharge outlet C. As the shaft 12 rotates about the axis, the blades 11 rotate and transfer any material located between two neighboring blades in the cross-sectional view toward the discharge outlet C.

Although not illustrated in the drawing, the line mixer is configured to be tilted toward the discharge outlet C with reference to the ground. In embodiments, the line mixer is tiltable at an angle from about 5 to 70 degrees. The tilting helps transfer of relatively large and heavy particles of marble chips toward the discharge outlet C as the gravity will apply to the marble chips. The line mixer may be tilted at varying angles depending upon the size or weight of the marble chips used at the time of operation. One of ordinary skill in the art will appreciate appropriate angles to tilt the line mixer based on the weight and/or size of the marble chips.

In the illustrated embodiment, the inlet A for marble chips is located directly above a portion 15 of the shaft 12. Unlike at other portions of the shaft, blades are not formed at the portion 15 of the shaft 12. This configuration is to prevent marble chips supplied into the line mixer from bumping into the rotating blades or screws and therefore prevent the marble chips from breaking into smaller pieces. Further, this configuration prevents the blade from being damaged by the marble chips dumped into the interior space of the mixer through the inlet.

In operation, marble chips are supplied to the line mixer through the inlet A. The marble chips entered the interior space of the conduit are transferred toward the discharge outlet C by the rotating blades 11. The marble chips entered the interior space, however, may not be transferred at once. Rather, the rotating blades may transfer only part of the marble chips entered the interior space. The rotating blades may transfer the marble chips at a substantially constant transfer rate. The transfer or feed rate (an amount of the marble chips transferred per unit period) may depend on, among others, primarily the pitch of the blades. The larger the pitch is, the more marble chips may be transferred, vice versa. As such, the marble chips entering the interior space of the line mixer is relatively continuously transferred toward the discharge outlet C passing a point directly under the inlet B.

On the other hand, the resin slurry is supplied and enters the interior space of the line mixer through the inlet B. In one embodiment, a conventional line mixer may be used to mix and feed the resin slurry. The resin slurry drops over the marble chips passing the point directly under the inlet B. Since the blades 11 are constantly rotating, the marble chips and resin slurry are mixed together as they move toward the discharge outlet C. On the way to the discharge outlet C, the polymerizable compounds in the resin slurry polymerize as discussed above, and therefore the mixture thickens. The polymerization may begin before the resin slurry enters the line mixture. When the mixture reaches the discharge outlet C, the mixture turns to a curable composition which is at least partly solid with some fluidity. The discharged curable composition can be cured according to conventional methods.

Although not illustrated, in some embodiments, the line mixer may be equipped with a de-foaming device and/or an ultrasonic vibrator. During the mixing in the line mixer, certain gases may be generated in the mixture, for example, by the polymerization reactions. These gases may generate bubbles in the curable composition and resulting artificial marble, which is undesirable. The ultrasonic vibrator may help bubbles generated in the mixture move to the surface of the mixture. The de-foaming device may remove the bubbles that exist on or near the surface. A pump and/or quantitative feeding belt may be used along with the line mixer as discussed above.

The invention is further described in terms of the following examples which are intended for the purpose of illustration and are not to be construed as in any way limiting the scope of the present invention, which is defined in the claims. In the following examples, all parts and percentage are by weight unless otherwise indicated.

EXAMPLE 1

Preparation of marble chips: 100 parts by weight of methyl methacrylate syrup, 120 parts by weight of aluminium hydroxide and 1 part by weight of lauroyl peroxide were mixed, cured and then pulverized to particle sizes of 11.8-25.4 mm and 8.47-11.7 mm. The methyl methacrylate syrup was composed of a mixture of 30% of poly methyl methacrylate and 70% of methyl methacrylate.

Figure 4:
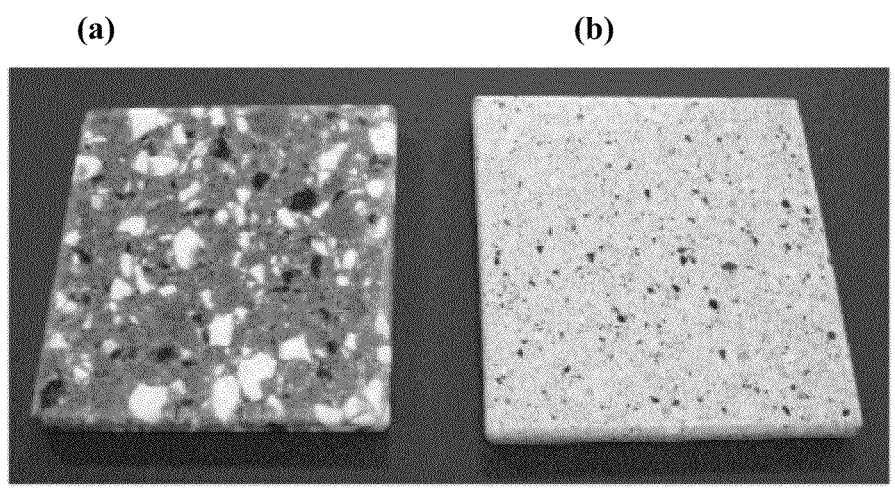
FIG. 4(a) is a photograph showing a surface pattern of artificial marble obtained in Example 1.
FIG. 4(b) is a photograph showing a surface pattern of an artificial marble obtained in Comparative Example 1.

Preparation of artificial marble: 30 parts by weight of the marble chips having a particle size of 11.8-25.4 mm and 30 parts by weight of the marble chips having a particle size of 8.47-11.7 mm were fed to a line mixer such as shown in FIG. 3 via inlet A. Resin slurry composed of 100 parts by weight of acrylic resin syrup, 155 parts by weight of aluminium hydroxide and 2 parts by weight of lauroyl peroxide was introduced to the line mixer via inlet B. The acrylic resin syrup was composed of 30% by weight of polymethylmethacrylate and 70% by weight of methyl methacrylate. The marble chips and the resin slurry were mixed in the line mixer at the speed of about 845 rpm to form mixed slurry. The mixed composition was transferred toward the discharge outlet C while being mixed and discharged onto a conveyer belt at a speed of 1.0 m/min. The mixed composition was cured on the conveyer belt and formed an artificial marble product in a flat plate form. The resulting product has marble chips with a particle size of 8.47-25.4 mm uniformly dispersed throughout. The surface pattern of the resulting product was shown in the photograph of FIG. 4(a).

Comparative Example 1

Comparative Example 1 was conducted in the same manner as in Example 1 except that conventional Kenics type line mixer was used instead of the line mixer used in Example 1. The resulting product has marble chips with a particle size of less than 5 mm. The surface pattern of the resulting product was shown in the photograph of FIG. 4(b).

What is claimed is:

1. A composite solid surface article produced by the method of:
    feeding a first composition toward a mixing point, the first composition comprising a polymerizable compound;
    feeding solid particles having a diameter from about 12 mm to about 100 mm toward the mixing point;
    mixing the first composition and the solid particles fed to the mixing point to form a second composition comprising the polymerizable compound and solid particles;
    transferring the second composition away from the mixing point;
    polymerizing the polymerizable compound in the second composition so as to form a curable composition comprising the solid particles; and
    curing the curable composition to provide a composite solid surface article.

2. A composite solid surface article produced by the method of:
    conveying solid particles having a diameter from about 12 mm to about 100 mm along a passage;
    adding a solid surface forming slurry to the solid particles that are being conveyed when the solid particles are passing a location in the passage;
    blending the solid surface forming slurry and the solid particles;
    thickening the solid surface forming slurry while blending, thereby forming a fluidable solid composition comprising the solid particles dispersed therein generally homogeneously; and
    solidifying the fluidable solid composition into a shape to provide a composite solid surface article.

3. A composite solid surface article, comprising:
    a matrix of at least one polymer resin;
    a filler dispersed in the matrix; and
    solid particles dispersed in the matrix having a size from about 12 to about 100 mm.

4. The article of claim 3, wherein the solid particles are generally homogeneously dispersed throughout the matrix of the article.

5. The article of claim 3, wherein the solid particles have a diameter from about 12 mm to about 50 mm.

6. The article of claim 3, further comprising additional the solid particles having a diameter from about 7 mm to about 15 mm.

7. The article of claim 3, wherein the at least one polymer resin comprises an acrylic resin.

8. The article of claim 3, wherein at least some of the solid particles have one or more colors, which are substantially different from a color surrounding the at least some of the solid particles in the article.

9. The article of claim 3, comprising solid particles having different sizes.

10. The article of claim 9, comprising solid particles having a diameter of about 12 mm to about 50 mm and solid particles having a diameter from about 7 mm to about 15 mm.

* * * * *